(12) United States Patent
Song

(10) Patent No.: US 10,817,715 B2
(45) Date of Patent: Oct. 27, 2020

(54) NUMBER-OF-PEOPLE DETECTION SYSTEM AND NUMBER-OF-PEOPLE DETECTION METHOD THEREOF

(71) Applicant: ULSee Inc., Taipei (TW)

(72) Inventor: Yu-Hao Song, Taipei (TW)

(73) Assignee: ULSee Inc., Taipei (TW)

( * ) Notice: Subject to any disclaimer, the term of this patent is extended or adjusted under 35 U.S.C. 154(b) by 56 days.

(21) Appl. No.: 16/021,438

(22) Filed: Jun. 28, 2018

(65) Prior Publication Data

US 2019/0065837 A1    Feb. 28, 2019

(30) Foreign Application Priority Data

Aug. 31, 2017  (CN) .......................... 2017 1 0769584

(51) Int. Cl.
| | |
|---|---|
| *G06K 9/00* | (2006.01) |
| *H04N 5/247* | (2006.01) |
| *G06T 7/593* | (2017.01) |
| *H04N 13/204* | (2018.01) |
| *H04N 13/239* | (2018.01) |

(52) U.S. Cl.
CPC ..... *G06K 9/00369* (2013.01); *G06K 9/00201* (2013.01); *G06K 9/00771* (2013.01); *G06T 7/593* (2017.01); *H04N 5/247* (2013.01); *H04N 13/204* (2018.05); *H04N 13/239* (2018.05); *G06T 2207/30196* (2013.01)

(58) Field of Classification Search
CPC ........... G06K 9/00369; G06K 9/00201; G06K 9/00771; H04N 13/239; H04N 13/204; G06T 2207/30196
USPC .......................... 382/103, 115–118, 124–127
See application file for complete search history.

(56) References Cited

U.S. PATENT DOCUMENTS

| | | | |
|---|---|---|---|
| 2014/0079282 A1* | 3/2014 | Marcheselli | G06K 9/00335 382/103 |
| 2014/0347475 A1* | 11/2014 | Divakaran | G06K 9/00771 348/135 |

* cited by examiner

*Primary Examiner* — Ayodeji O Ayotunde
(74) *Attorney, Agent, or Firm* — Alan D. Kamrath; Karin L. Williams; Mayer & Williams PC

(57) ABSTRACT

A number-of-people detection system includes at least one binocular camera and a computing circuit. A lens of the binocular camera is configured to capture at least one image of a target area. The computing circuit is electrically connected to the binocular camera, wherein the binocular camera is adapted to transmit the captured image to the computing circuit for analysis. When the captured image of the binocular camera shows that at least one human body in the target area, the computing circuit analyzes the captured image of the binocular camera and calculates a distance from the human body to the binocular camera by using a binocular vision method to determine a three-dimensional world coordinate relationship between the human body and the target area, so as to determine a number of people located in the target area.

7 Claims, 8 Drawing Sheets

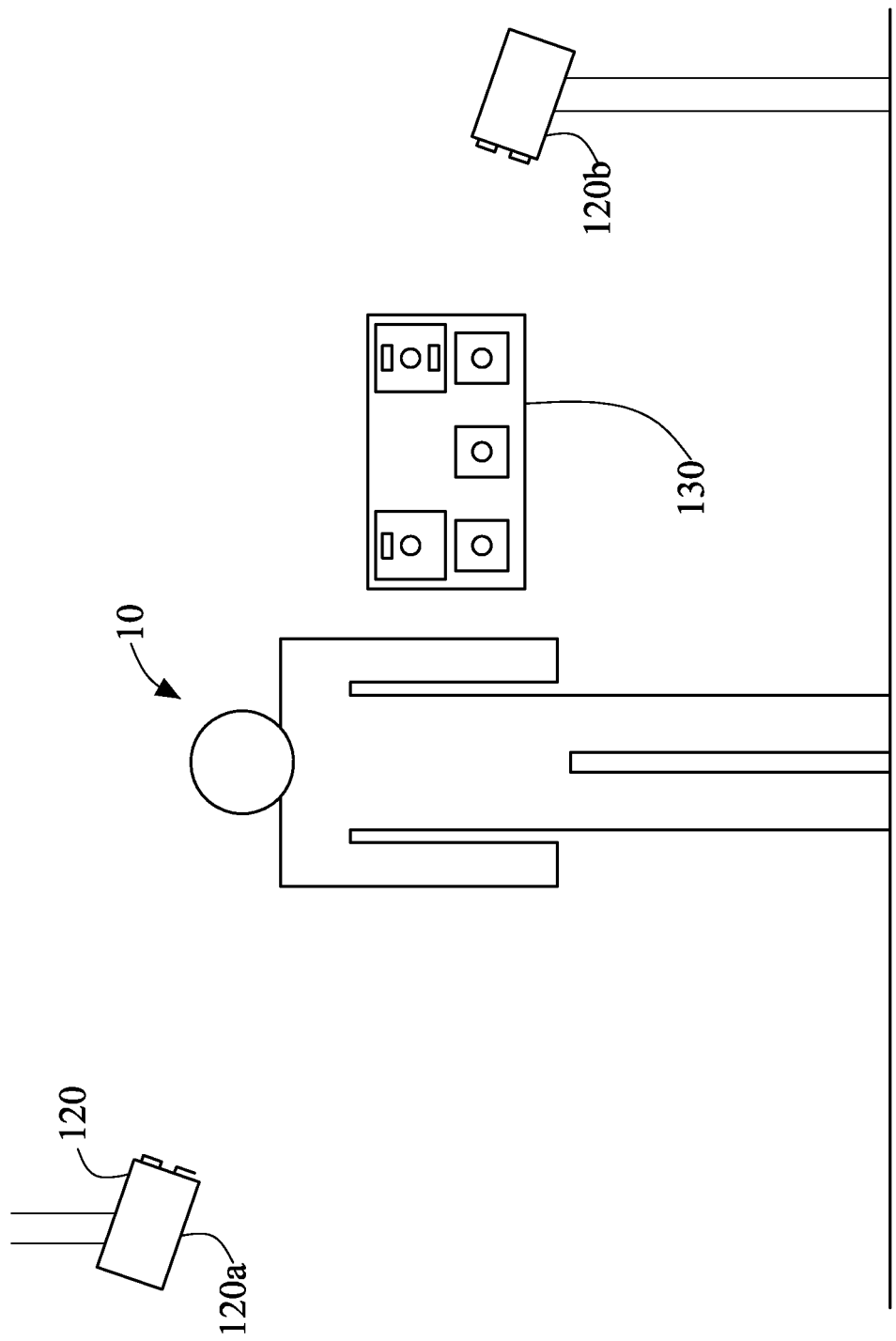

NUMBER-OF-PEOPLE DETECTION SYSTEM AND NUMBER-OF-PEOPLE DETECTION METHOD THEREOF

FIELD OF THE DISCLOSURE

The present disclosure relates to a number-of-people detection system and a number-of-people detection method, and more particularly to a number-of-people detection system and a number-of-people detection method for detecting a number of people in a target area.

BACKGROUND OF THE INVENTION

With the development of science and technology, many tasks that originally required manpower have gradually become automated. For example, there were staffs to check tickets at the entrances and exits of train stations in the past, but now they are automated. In addition, even at airports with higher safety requirements, more and more systems are used to allow people to automatically pass through.

However, no matter at a train station or an airport, the auto-gates can only allow one person to pass at one time, rather than allowing two or more people to pass at one time. In order to prevent two or more people from passing through the auto-gate at one time, some automatic customs systems will place pressure sensors on the ground within the target area, wherein the use of pressure when a person is walking on the ground guarantees that only one person passes in the target area to prevent tailgating behavior. However, this method cannot detect the situation in which two people are held together. If two people are held together, only one person has both feet on the ground. The other person can pass through the target area without permission. The pressure sensors have a high damage rate in a large number of continuous uses.

In addition, another common method on the market is to install a row of corresponding infrared emitters and receivers on two sides of the target area. A portion of infrared rays will be blocked when people pass through, and thus the blocked infrared rays can be used to determine how many people pass through the target area to prevent tailgating behavior. However, this method still cannot detect the situation in which two people are held together or one person is backed by another person, especially when adults hold children. What's more, when a person carries a lot of baggage, there will be multiple shelters, and the system will erroneously detect baggage as people in the target area.

Furthermore, an infrared emitter is hoisted at the top of the target area, and infrared reflections are used to calculate the distance between an object (or a person or the ground) directly below the emitter and the emitter. Therefore, the distance becomes small when someone passes by, and the number of people passing through the target area can be determined according to the changes in the distance, thereby preventing tailgating behavior. However, this method still has the above-mentioned problem of erroneous detection of baggage, and the above-mentioned situation that one person holds/backs another person still cannot be solved. In addition, this method is not sensitive to the situation that someone crawls cross the target area, and misjudgment is likely to occur. Hence, how to properly attach electronic components to clothing is worth considering to a person skilled in the art.

SUMMARY OF THE INVENTION

In view of the above-mentioned problems, a number-of-people detection system and a number-of-people detection method are provided in the present disclosure, which can effectively detect a number of people passing through a target area.

It is one objective of the present disclosure to provide a number-of-people detection system.

According to one exemplary embodiment of the present disclosure, a number-of-people detection system is provided. The number-of-people detection system includes at least one binocular camera and a computing circuit. A lens of the binocular camera is configured to capture at least one image of a target area. The computing circuit is electrically connected to the binocular camera, wherein the binocular camera is adapted to transmit the captured image to the computing circuit for analysis. When the captured image of the binocular camera shows that at least one human body in the target area, the computing circuit analyzes the captured image of the binocular camera and calculates a distance from the human body to the binocular camera by using a binocular vision method to determine a three-dimensional world coordinate relationship between the human body and the target area, so as to determine a number of people located in the target area.

In one example, a number of the at least one binocular camera is plural, and the at least one binocular camera comprises a first binocular camera and a second binocular camera.

In one example, the number-of-people detection system further includes a set of characteristic patterns. The set of characteristic patterns comprises a first pattern and a second pattern, a shape of the first pattern is different from a shape of the second pattern, and the first pattern and the second pattern are located within a shooting range of the first binocular camera and the second binocular camera In one example, both the shape of the first pattern and the shape of the second pattern comprise a circular pattern.

In one example, the set of characteristic patterns further include a plurality of third patterns, wherein an arrangement direction of the plurality of third patterns is parallel to an arrangement direction of the first pattern and the second pattern, and the plurality of third patterns are different from the first pattern and the second pattern.

According to one exemplary embodiment of the present disclosure, a number-of-people detection method is provided. The number-of-people detection method includes the following steps:

S10: providing at least one binocular camera, wherein a lens of the binocular camera is configured to capture at least one image of a target area;

S20: when the captured image of the binocular camera shows that at least one human body in the target area, analyzing the captured image of the binocular camera;

S30: calculating a distance from the human body to the binocular camera by using a binocular vision method;

S40: determining a three-dimensional world coordinate relationship between the human body and the target area; and S50: determining a number of people located in the target area.

In one example, the number-of-people detection method further includes a step S25 between the step S20 and the step S30.

S25: acquiring positions of bone joints of the human body.

In one example, in the step S10, a number of the at least one binocular camera is plural, and the at least one binocular camera comprises a first binocular camera and a second binocular camera.

In one example, the number-of-people detection method further includes a step S15 between the step S10 and the step S20.

S15: providing a set of characteristic patterns, wherein the set of characteristic patterns comprises a first pattern and a second pattern, a shape of the first pattern is different from a shape of the second pattern, and the first pattern and the second pattern are located within a shooting range of the first binocular camera and the second binocular camera.

In one example, both the shape of the first pattern and the shape of the second pattern comprise a circular pattern.

In one example, the set of characteristic patterns further include a plurality of third patterns, wherein an arrangement direction of the plurality of third patterns is parallel to an arrangement direction of the first pattern and the second pattern, and the plurality of third patterns are different from the first pattern and the second pattern.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which:

FIG. 2B is a schematic diagram of a disposal a first binocular camera and a second binocular camera according to an embodiment of the present disclosure.

DESCRIPTION OF THE PREFERRED EMBODIMENTS

Figure 1A:
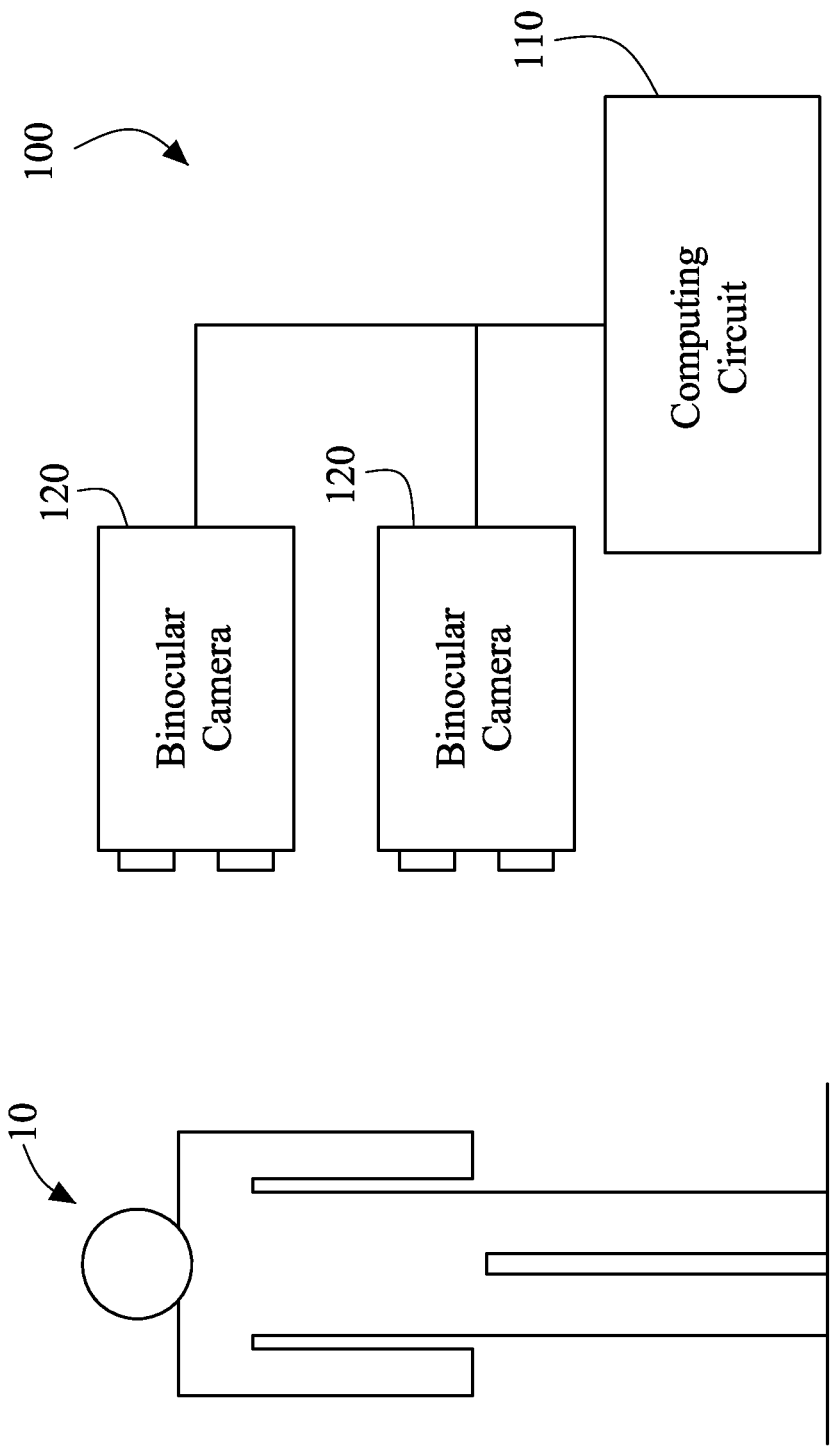
FIG. 1A is a schematic diagram of a number-of-people detection system according to an embodiment of the present disclosure.

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . ." The terms "couple" and "coupled" are intended to mean either an indirect or a direct electrical connection. Thus, if a first device couples to a second device, that connection may be through a direct electrical connection, or through an indirect electrical connection via other devices and connections.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications, patents and patent applications mentioned herein are incorporated herein in their entirety.

It is also noted that as used herein and in the appended claims, the singular forms "a", "and", and "the" include plural referents unless the context clearly dictates otherwise. In the claims, the terms "first," "second", and so forth are to be interpreted merely as ordinal designations they shall not be limited in themselves. Further, the use of exclusive terminology such as "solely," "only" and the like in connection with the recitation of any claim element is contemplated. Also, it is contemplated that any element indicated to be optional herein may be specifically excluded from a given claim by way of a "negative" limitation. Finally, it is contemplated that any optional feature of the inventive variation(s) described herein may be set forth and claimed independently or in combination with any one or more of the features described herein.

The figures are only illustrations of an example, wherein the circuits or procedure shown in the figures are not necessarily essential for implementing the present disclosure. Those skilled in the art will understand that the circuits in the device in the example can be arranged in the device in the examples as described, or can be alternatively located in one or more devices different from that in the examples.

The circuits in the examples described can be combined into one module or further divided into a plurality of sub-circuits.

Please refer to FIG. 1A. FIG. 1A is a schematic diagram of a number-of-people detection system according to an embodiment of the present disclosure. The number-of-people detection system 100 uses a binocular camera 120 to capture at least one image of a target area 121, and calculates a number of people within the target area 121 to achieve a purpose of detecting the number of people, and to further accurately determine the number of people getting in and out of important areas.

The number-of-people detection system 100 includes at least one binocular camera 120 (two binocular cameras are shown in FIG. 1A) and a computing circuit 110. A lens of the binocular camera 120 is configured to capture at least one image of a target area 121. The computing circuit 110 is electrically connected to the binocular cameras 120, wherein the binocular cameras 120 are adapted to transmit the captured images to the computing circuit 110 for analysis. When the captured image(s) of the binocular camera(s) 120 shows that at least one human body 10 in the target area 121, the computing circuit 110 analyzes the captured image of the binocular camera(s) 120 and calculates a distance from the human body 10 to the binocular camera(s) 120 by using a binocular vision method to determine a three-dimensional world coordinate relationship between the human body (10) and the target area 121, so as to determine a number of people located in the target area 121.

Figure 1B:
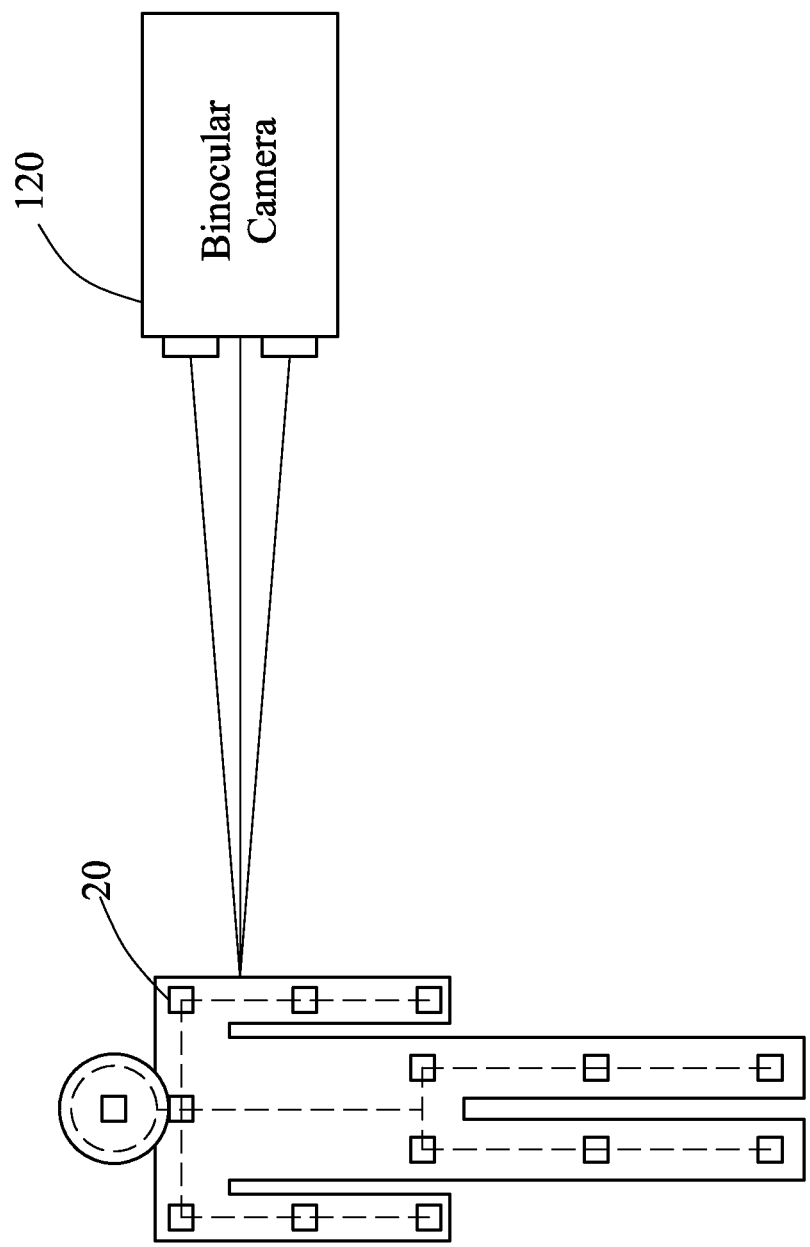
FIG. 1B is a schematic diagram of an analysis image of a computing circuit according to an embodiment of the present disclosure.

Please refer to FIG. 1B. FIG. 1B is a schematic diagram of an analysis image of a computing circuit 110 according to an embodiment of the present disclosure. After the binocular camera 120 captures an image, the computing circuit 110 will detect each of bone joints 20 of the human body 10, such as, positions of head, neck, arms, hands, buttocks, knees, and feet, in order to obtain information such as a face position frame and a body position frame. After that, A binocular vision method is used for calculating a distance from the human body 10 to the binocular camera 120 in order to acquire a position coordinate of the human body 10 in the three-dimensional world coordinate. By comparing the three-dimensional world coordinate relationship between the position coordinate of the human body 10 and the position coordinate of the target area 121, the number of people getting in and out of the target area 121 can be determined. In one embodiment, if only a single binocular camera 120 is used, the binocular camera 120 is used as a center to define the three-dimensional world coordinate, and the number of people getting in and out can be determined through the distance to the position coordinate of the human body 10.

Figure 2A:
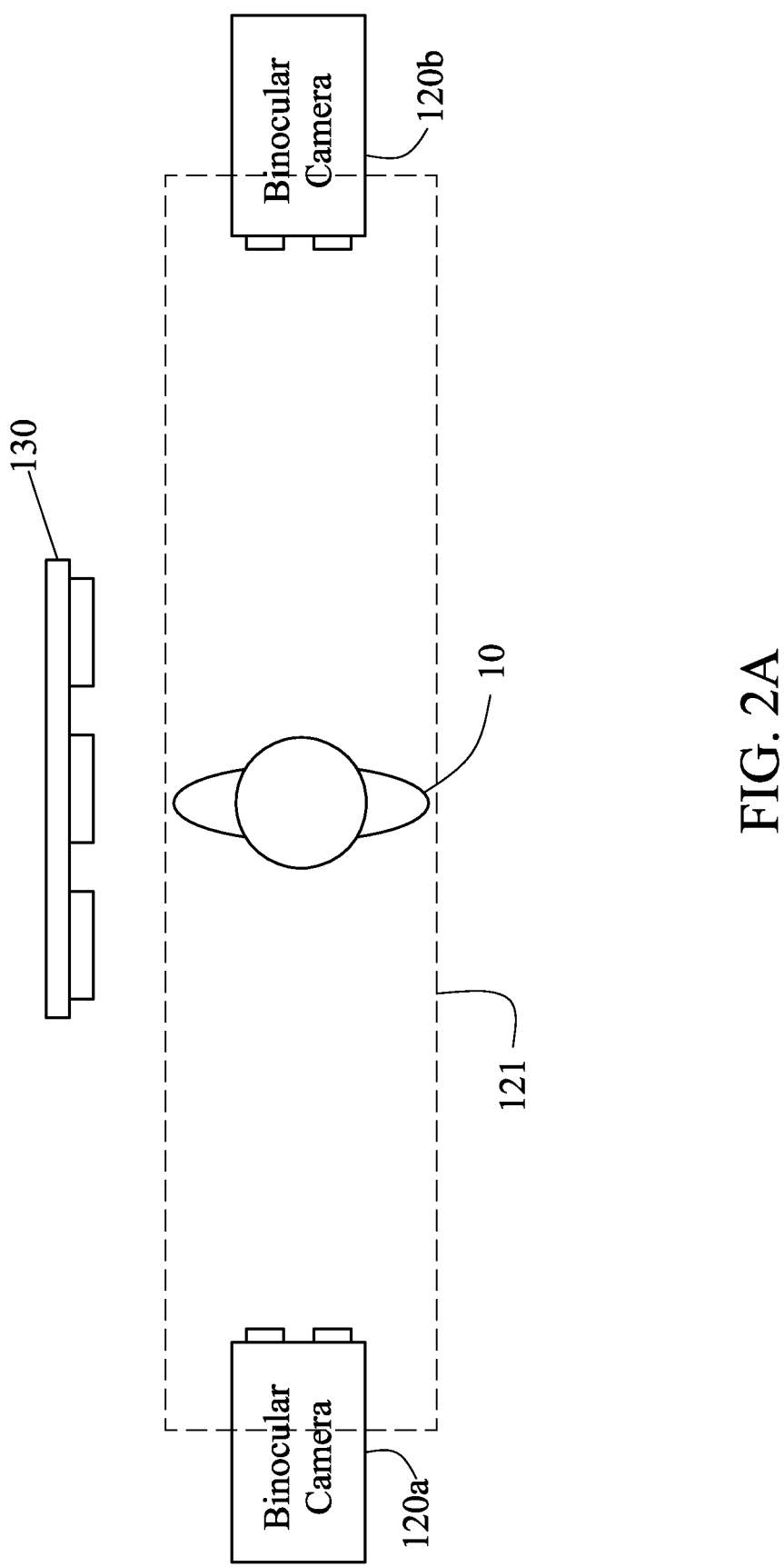
FIG. 2A is a schematic diagram of a number-of-people detection system according to another embodiment of the present disclosure.

Please refer to FIG. 2A. FIG. 2A is a schematic diagram of a number-of-people detection system according to another embodiment of the present disclosure, and FIG. 2A shows a top view. In this embodiment, the number-of-people detection system 100 includes a first binocular camera 120a and a second binocular camera 120b disposed at two ends of the target area 121, respectively, wherein both the lens of the first binocular camera 120a and the second binocular camera 120b are disposed towards the target area 121. In this embodiment, a plurality of binocular cameras 120a and 120b are adopted. Please refer to FIG. 2B. FIG. 2B is a schematic diagram of a disposal of a first binocular camera and a second binocular camera according to an embodiment of the present disclosure. The first binocular camera 120a and the second binocular camera 120b are disposed at two sides of the human body 10. In the embodiment of FIG. 2B, the disposal heights of the first binocular camera 120a and the second binocular camera 120b are different to each other, which capture the images of the human body 10 from different angles. The first binocular camera 120a is suspended on the ceiling, and the second binocular camera 120b is disposed on the ground.

However, a plurality of binocular cameras 120 may be involved in the definition and integration problem of three-dimensional world coordinate. In the embodiment of FIG. 2A, the number-of-people detection system 100 further includes a characteristic pattern 130, and the characteristic pattern 130 is disposed within a shooting range of the first binocular camera 120a and the second binocular camera 120b, which can be acted as the basis that the first binocular camera 120a and the second binocular camera 120b define the three-dimensional world coordinate.

Figure 3A:
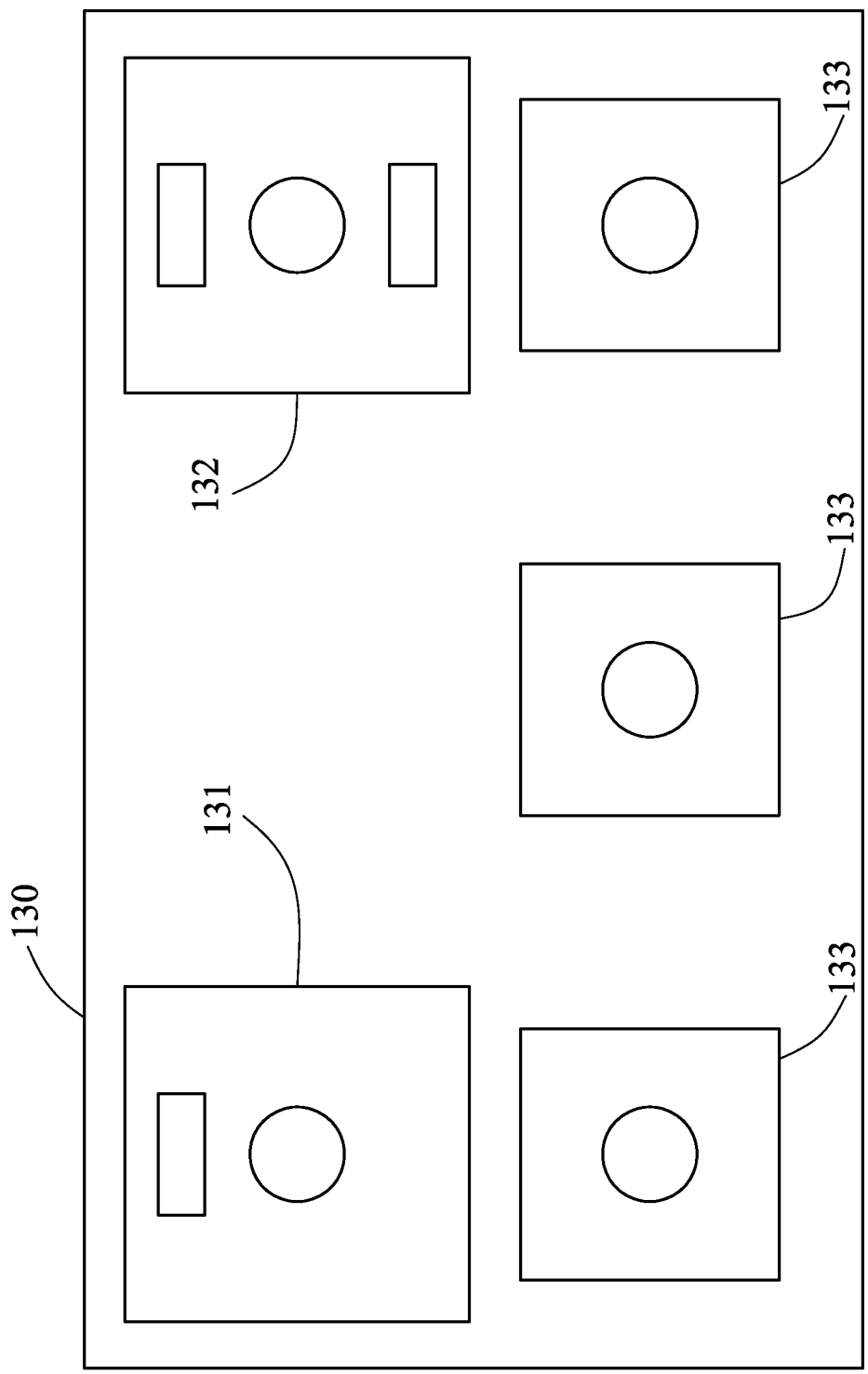
FIG. 3A is a schematic diagram of a characteristic pattern according to an embodiment of the present disclosure.

Please refer to FIG. 3A. FIG. 3A is a schematic diagram of a characteristic pattern according to an embodiment of the present disclosure. The characteristic pattern 130 includes a first pattern 131, a second pattern 132, and a plurality of third patterns 133. The shape of the first pattern 131 is different from the shape of the second pattern 132, and the first pattern 131 and the second pattern 132 are disposed within the shooting range of the first binocular camera 120a and the second binocular camera 120b. In this embodiment, both the shape of the first pattern 131 and the shape of the second pattern 132 include a circular pattern. The shape of the plurality of third patterns 133 is different from the shape of the first pattern 131 and the shape of the second pattern 132, but the first pattern 131 has one more bar than the second pattern 132. An arrangement direction of the plurality of third patterns 133 is parallel to an arrangement direction of the first pattern 131 and the second pattern 132.

Figure 3B:
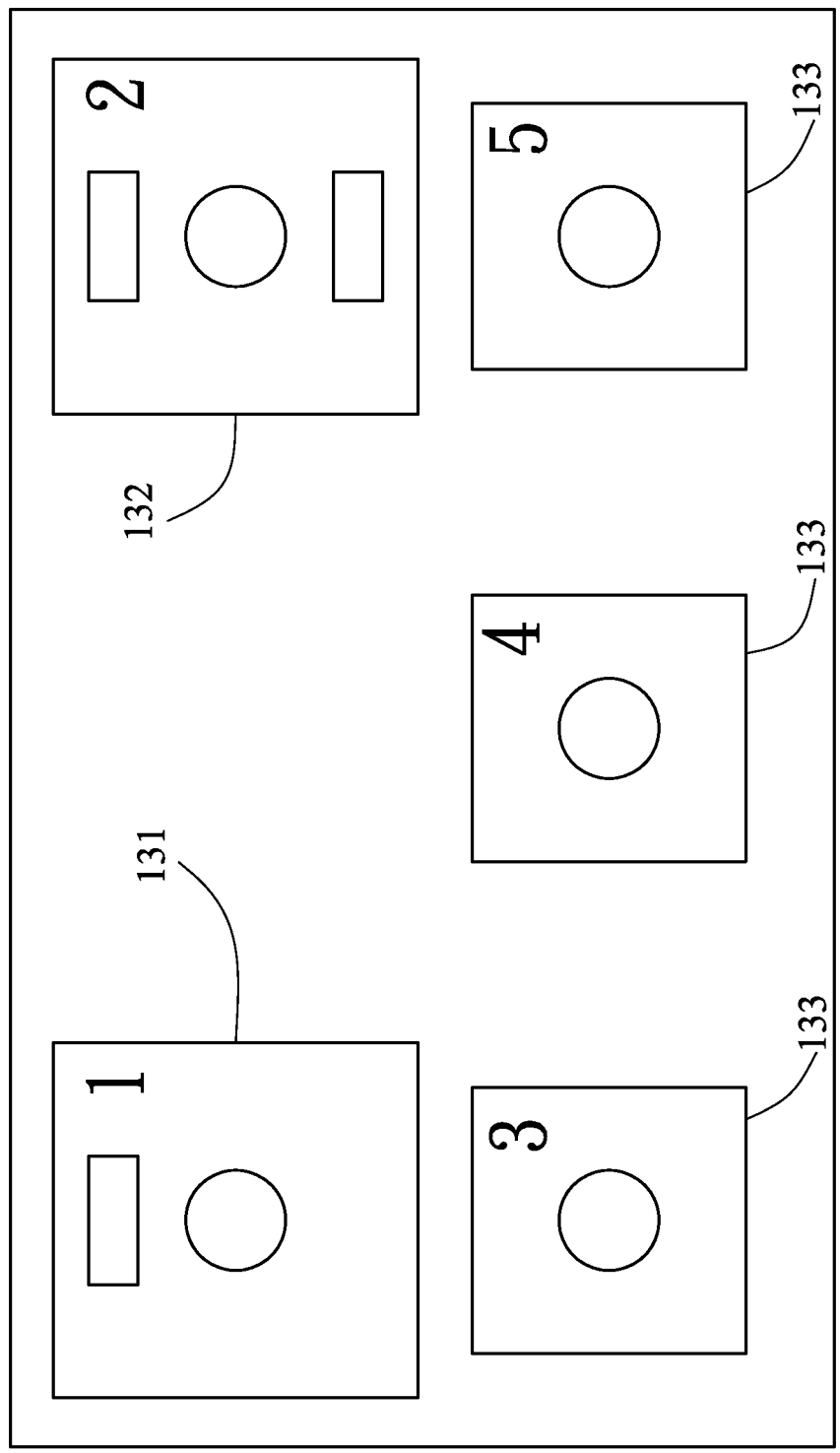
FIG. 3B is a schematic diagram of a characteristic pattern number according to an embodiment of the present disclosure.

Please refer to FIG. 3B. FIG. 3B is a schematic diagram of a characteristic pattern number according to an embodiment of the present disclosure. When the characteristic pattern 130 is captured by the first binocular camera 120a and the second binocular camera 120b, the computing circuit 110 will provide the first pattern 131, the second pattern 132, and the plurality of third patterns 133 with corresponding numbers. For example, the number corresponding to the first pattern 131 is 1; the number corresponding to the second pattern 132 is 2; the numbers corresponding to the plurality of third patterns 133 are 3 to 5 from left to right. The shape of the first pattern 131 is different from the shape of the second pattern 132. Hence, although the angle photographed by the first binocular camera 120a is different from the angle photographed by the second binocular camera 120b, the first pattern 131, the second pattern 132, and the plurality of third patterns 133 can be recognized and given corresponding numbers. After the numbers and the direction are confirmed, the three-dimensional world coordinate may be defined based on the characteristic pattern 130. The first binocular camera 120a and the second binocular camera 120b may respectively calculate the distance between itself and the characteristic pattern 130 by using a binocular vision method, and may define the positions of the first binocular camera 120a and the second binocular camera 120b in the three-dimensional world coordinate based on the calculated distances. By the disposal and recognition of the characteristic pattern 130, the coordinate positions of the plurality of binocular cameras 120 may be integrated.

In this embodiment, the first pattern 131, the second pattern 132, and the plurality of third patterns 133 included by the characteristic pattern 130 totally have five center positions. After the characteristic pattern 130 is captured by the first binocular camera 120a, the five center positions can be found, and the second binocular camera 120b can also capture the five center positions. Therefore, the relationship between the first binocular camera 120a and the second binocular camera 120b in space can be calculated based on the five center positions. The color of characteristic pattern 130 may be black and white. When the five center positions are captured by the first binocular camera 120a and the second binocular camera 120b, the five center positions are indicated by circles.

The first binocular camera 120a and the second binocular camera 120b adopt a pinhole camera model. In addition to the three-dimensional world coordinate, the first binocular camera 120a and the second binocular camera 120b will have their own camera coordinates, and the image formed by the object being photographed is an image coordinate system. When a real object is photographed by the binocular camera 120, it is mapped into the camera coordinate and divided by the third dimension to form an image. For a point (a center point) in a real space, this point is imaged in the images photographed by the first binocular camera 120a and the second binocular camera 120b. That is to say, this point is mapped to two camera coordinates, respectively. The characteristic pattern 130 is this point. After this point is found, the equations of the camera coordinate mapping process of the first binocular camera 120a and the second binocular camera 20b can become simultaneous equations to solve the position relationship between the two camera coordinates.

Figure 4:
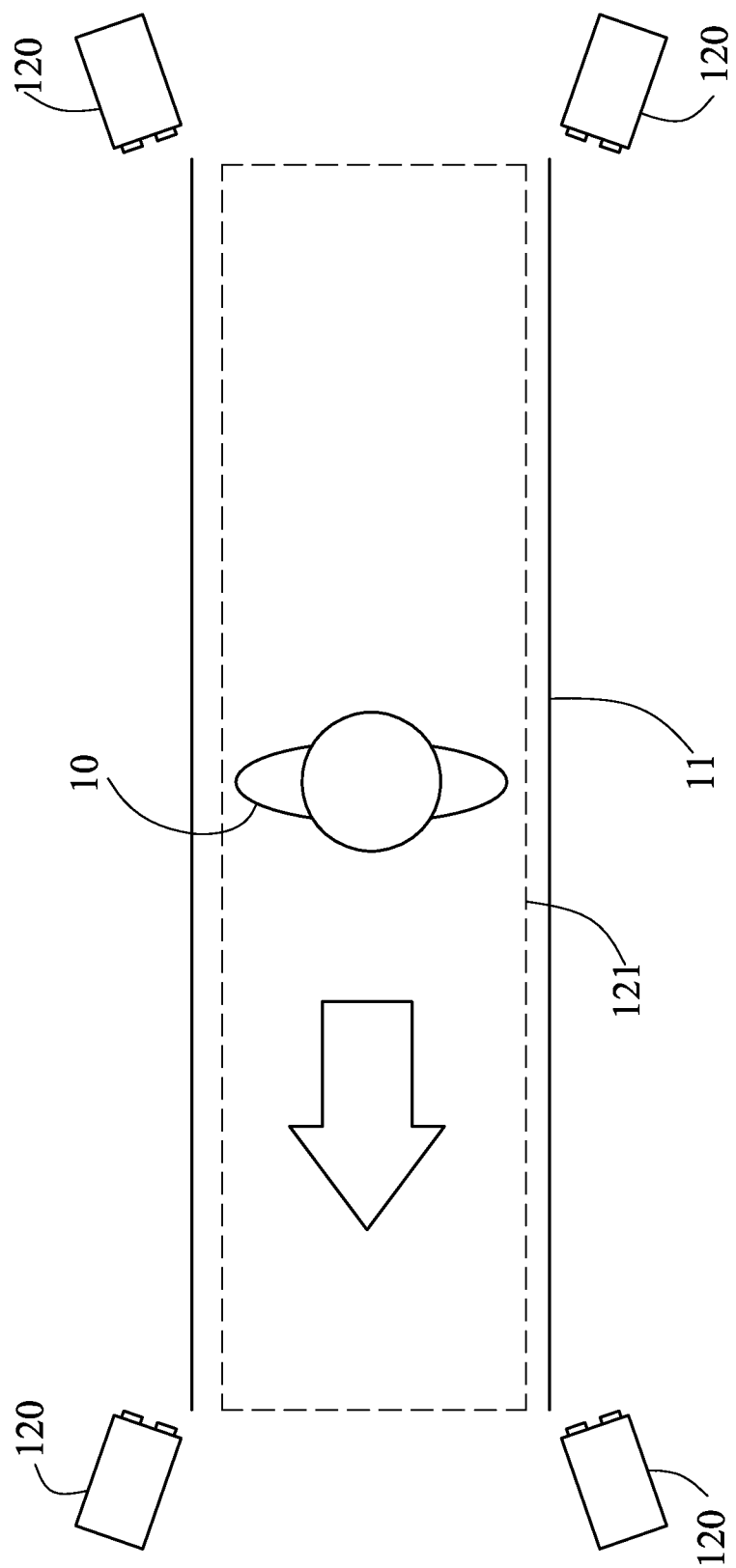
FIG. 4 is a top view of a number-of-people detection system according to yet another embodiment.

Please refer to FIG. 4. FIG. 4 is a top view of a number-of-people detection system according to yet another embodiment. In this embodiment, the target area 121 is, for example, a customs passage 11, wherein only one person is allowed to pass at one time, and the characteristic pattern 130 is, for example, a pattern printed on the floor of the customs passage 11. The number-of-people detection system 100 is provided with four binocular cameras 120, which are respectively disposed at four corners of the customs passage 11 to photograph the target area 121 from four angles, thereby preventing intentional people from trying to confuse the number-of-people detection by masking. If more than one person in the target area 121 is found, an alert can be issued immediately.

Figure 5:
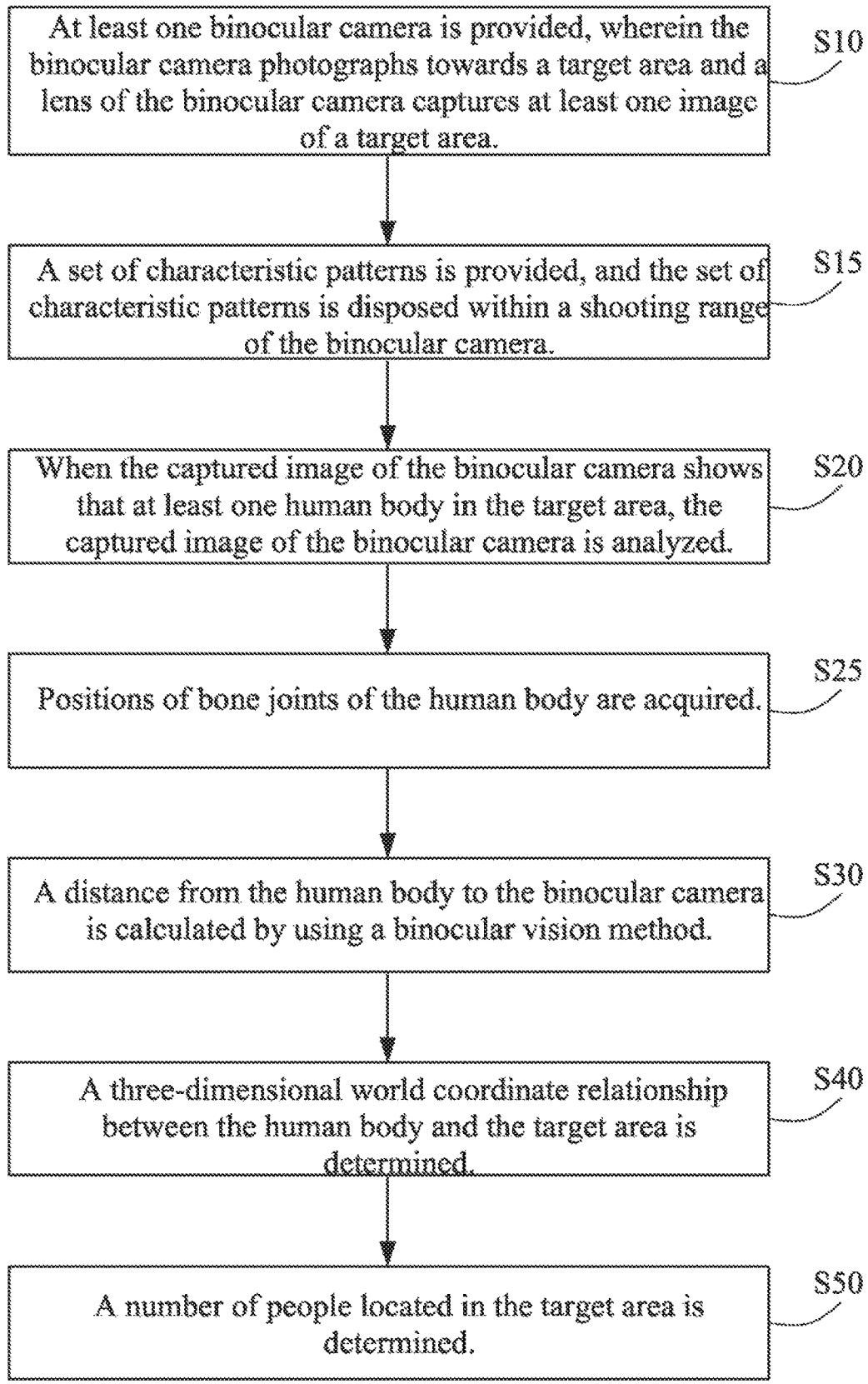
FIG. 5 is a flowchart illustrating the procedures of a number-of-people detection method according to an embodiment of the present disclosure.

Please refer to FIG. 5. FIG. 5 is a flowchart illustrating the procedures of a number-of-people detection method according to an embodiment of the present disclosure. The number-of-people detection method includes the following steps. First, in step S10, at least one binocular camera 120 is provided, wherein a lens of the binocular camera 120 is configured to photograph towards a target area 121 and capture at least one image of the target area 121. In a preferred embodiment, a plurality of binocular cameras 120 is provided and includes a first binocular camera 120a and a second binocular camera 120b. In step S15, a set of characteristic patterns 130 is provided, wherein the set of characteristic patterns 130 is disposed within a shooting range of the binocular camera 120. In a preferred embodiment, the set of characteristic patterns 130 includes a first pattern 131, a second pattern 132, and a plurality of third patterns 133. Both the first pattern 131 and the second pattern 132 include a circular pattern, but a shape of the first pattern is different from a shape of the second pattern. An arrangement direction of the plurality of third patterns is parallel to an arrangement direction of the first pattern and the second pattern, and the set of characteristic pattern 130 is adapted to allow a plurality of binocular cameras 120 to incorporate a coordinate system.

In step S20, after the disposal of the binocular camera 120 and the set of characteristic pattern 130 are completed, the captured image of the binocular camera 120 is analyzed when the captured image of the binocular camera 120 shows that at least one human body 10 in the target area 121. In step S25, positions of bone joints 20 of the human body 10 in the image are acquired during analysis to further obtain information such as a face position frame and a human body position frame. In step S30, a distance from the human body 10 to the binocular camera 120 is calculated by using a binocular vision method. In a preferred embodiment, a plurality of binocular cameras 120 will photograph the set of characteristic patterns 130 from different angles at the same time, such that the directionality may be discriminated by the first pattern 131, the second pattern 132, and the plurality of third patterns 133 that are different in appearance on the set of characteristic patterns 130. The position of the set of characteristic patterns 130 can be used as a coordinate reference point, so that the coordinates of the plurality of binocular cameras 120 are defined according to the distances between the plurality of binocular cameras 120 and the set of characteristic patterns 130, and the effect of integrating the coordinate systems of the plurality of binocular cameras 120 is achieved.

After confirming the distance between the human body 10 and the binocular camera 120, the position of the human body 10 in the three-dimensional world coordinate can be defined. In step S40, a three-dimensional world coordinate relationship between the human body 10 and the target area 121 is determined. In step S50, a number of people located in the target area 121 is determined. By determining the number of people located in the target area 121, the number of people located in the target area 121 can be further handled. Therefore, the number-of-people detection method of the present invention can be applied to places where it is necessary to control the number of people getting in and out important areas, such as customs.

The number-of-people detection system 100 and the method detection method of the present invention use the binocular camera 120 to photograph towards the target area 121 and determine the number of people by using the relationship between the coordinate of the human body 10 in the target area 121 and the three-dimensional world coordinate. In this way, the number of people located in the target area 121 can be effectively calculated, and it can avoid intentional people evading the number-of-people control by following, backing, or holding other people, and it can also avoid erroneously judging objects other than human body as human body.

Reference in the specification to "one example" or "an example" means that a particular feature, structure, or characteristic described in connection with the example is included in at least an implementation. The appearances of the phrase "in one example" in various places in the specification are not necessarily all referring to the same example. Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The above are only preferred examples of the present disclosure is not intended to limit the present disclosure within the spirit and principles of the present disclosure, any changes made, equivalent replacement, or improvement in the protection of the present disclosure should contain within the range.

Those skilled in the art will readily observe that numerous modifications and alterations of the device and method may be made while retaining the teachings of the invention. Accordingly, the above disclosure should be construed as limited only by the meters and bounds of the appended claims.

What is claimed is:

1. A number-of-people detection system, comprising:
    at least one binocular camera, a lens of the binocular camera is configured to capture at least one image of a target area, wherein a number of the at least one binocular camera is plural, and the at least one binocular camera comprises a first binocular camera and a second binocular camera;
    a set of characteristic patterns, wherein the set of characteristic patterns comprises a first pattern and a second pattern, a shape of the first pattern is different from a shape of the second pattern, and the first pattern and the second pattern are located within a shooting range of the first binocular camera and the second binocular camera; and
    a computing circuit, electrically connected to the binocular camera, wherein the binocular camera is adapted to transmit the captured image to the computing circuit for analysis; wherein when the captured image of the binocular camera shows that at least one human body in the target area, the computing circuit analyzes the captured image of the binocular camera and calculates a distance from the human body to the binocular camera by using a binocular vision method to determine a three-dimensional world coordinate relationship between the human body and the target area, so as to determine a number of people located in the target area; wherein by the disposal and recognition of the set of characteristic patterns, coordinate positions of the first binocular camera and the second binocular camera are integrated.

2. The number-of-people detection system of claim 1 wherein both the shape of the first pattern and the shape of the second pattern comprise a circular pattern.

3. The number-of-people detection system of claim 1, wherein the set of characteristic patterns further comprise a plurality of third patterns, an arrangement direction of the plurality of third patterns is parallel to an arrangement direction of the first pattern and the second pattern, and the plurality of third patterns are different from the first pattern and the second pattern.

4. A number-of-people detection method, comprising steps of:
    S10: providing at least one binocular camera, wherein a lens of the binocular camera is configured to capture at least one image of a target area, wherein a number of the at least one binocular camera is plural, and the at least one binocular camera comprises a first binocular camera and a second binocular camera;
    S15: providing a set of characteristic patterns, wherein the set of characteristic patterns comprises a first pattern and a second pattern, a shape of the first pattern is different from a shape of the second pattern, and the first pattern and the second pattern are located within a shooting range of the first binocular camera and the second binocular camera;
    S20: when the captured image of the binocular camera shows that at least one human body in the target area, analyzing the captured image of the binocular camera;
    S30: calculating a distance from the human body to the binocular camera by using a binocular vision method;
    S40: determining a three-dimensional world coordinate relationship between the human body and the target area, wherein by the disposal and recognition of the set of characteristic patterns, coordinate positions of the first binocular camera and the second binocular camera are integrated; and
    S50: determining a number of people located in the target area.

5. The number-of-people detection method of claim 4, further comprising a step S25 between the step S20 and the step S30: S25: acquiring positions of bone joints of the human body.

6. The number-of-people detection method of claim 4, wherein both the shape of the first pattern and the shape of the second pattern comprise a circular pattern.

7. The number-of-people detection method of claim 4, wherein the set of characteristic patterns further comprise a plurality of third patterns, an arrangement direction of the plurality of third patterns is parallel to an arrangement direction of the first pattern and the second pattern, and the plurality of third patterns are different from the first pattern and the second pattern.

* * * * *